United States Patent
Sun et al.

(10) Patent No.: US 12,361,574 B2
(45) Date of Patent: Jul. 15, 2025

(54) DEPTH CAMERA CAPABLE OF MEASURING THE OBLIQUE VELOCITY OF AN OBJECT

(71) Applicant: NATIONAL CENTRAL UNIVERSITY, Taoyuan (TW)

(72) Inventors: Wen-Hsin Sun, Taoyuan (TW); Jun-Yi Yu, Taoyuan (TW); Siang-Siuan Tsai, Taoyuan (TW); Guan-Wei Huang, Taoyuan (TW); Ching-Cherng Sun, Taoyuan (TW)

(73) Assignee: National Central University, Taoyuan (TW)

( * ) Notice: Subject to any disclaimer, the term of this patent is extended or adjusted under 35 U.S.C. 154(b) by 72 days.

(21) Appl. No.: 18/378,795

(22) Filed: Oct. 11, 2023

(65) Prior Publication Data

US 2025/0045941 A1 Feb. 6, 2025

(30) Foreign Application Priority Data

Jul. 31, 2023 (TW) ................... 112128718

(51) Int. Cl.
  *G06T 7/50* (2017.01)
  *G06T 7/20* (2017.01)
  *H04N 23/51* (2023.01)

(52) U.S. Cl.
  CPC .................. *G06T 7/50* (2017.01); *G06T 7/20* (2013.01); *H04N 23/51* (2023.01); *G06T 2207/10028* (2013.01)

(58) Field of Classification Search
  CPC ... G06T 2207/10028; G06T 7/20; G06T 7/50; H04N 23/51
  See application file for complete search history.

(56) References Cited

U.S. PATENT DOCUMENTS

| | | | |
|---|---|---|---|
| 10,636,158 B1 * | 4/2020 | Kamiyama | G06T 7/50 |
| 2015/0294160 A1 * | 10/2015 | Takahashi | G06T 11/206 382/104 |
| 2017/0369165 A1 * | 12/2017 | Yamada | H04N 23/72 |
| 2021/0094577 A1 * | 4/2021 | Shalev-Shwartz | G05D 1/249 |
| 2022/0129066 A1 * | 4/2022 | Zahnert | G06F 3/012 |
| 2024/0144595 A1 * | 5/2024 | Ponjou Tasse | G06V 10/82 |

* cited by examiner

*Primary Examiner* — Amy R Hsu
(74) *Attorney, Agent, or Firm* — Juan Carlos A. Marquez; Marquez IP Law Office, PLLC

(57) ABSTRACT

A depth camera capable of measuring the oblique velocity of an object is provided, wherein a depth camera capable of measuring the lateral velocity of an object includes a depth camera body, a first configuration file, and a lateral velocity calculation system. The lateral velocity calculation system includes: first image-processing software for recording a first depth distance at which images are taken of an object and for calculating the number of pixels corresponding to a lateral movement of the object and the duration of the lateral movement; and lateral velocity calculation software for calculating the lateral velocity of the object. The depth camera capable of measuring the oblique velocity of an object allows the lateral/longitudinal/oblique velocity of an object to be measured in real time using image-related techniques.

10 Claims, 6 Drawing Sheets

DEPTH CAMERA CAPABLE OF MEASURING THE OBLIQUE VELOCITY OF AN OBJECT

BACKGROUND OF THE INVENTION

1. Technical Field

The present invention relates to a depth camera that can measure the oblique velocity of an object. More particularly, the invention relates to a depth camera that uses image-related techniques to measure the oblique velocity of a moving object.

2. Description of Related Art

Depth cameras can be used to capture depth-related information (e.g., a depth distance) and is particularly suitable for use in various non-contact sensing applications, some common examples of which are facial recognition, measurement of speed, object tracking, and 3D scanning and modeling. The existing depth cameras, however, cannot measure the lateral, longitudinal, or oblique velocity of a moving object or image.

FIG. 1 shows a conventional depth camera 11 such as the Intel RealSense D455 depth camera. The depth camera 11 at least includes a set of lenses 11a, a computation unit 11c, and a storage unit 11b. The configuration file of the depth camera 11 records the length l of each image sensor of the depth camera and the focal length f of each lens. Taking three-dimensional (3D) images with such a conventional depth camera and applying optical theories to the depth-related information of the images taken can hopefully produce the innovative effect of measuring the velocity of an object or image and thereby upgrade the conventional depth camera.

SUMMARY OF THE INVENTION

The present invention provides a depth camera capable of measuring the oblique velocity of an object. The major technical problem to be solved by the invention is to overcome the aforesaid deficiency of the prior art that the prior art cannot measure the lateral/longitudinal/oblique velocity of an object effectively with image-related techniques.

The present invention provides a depth camera capable of measuring the oblique velocity of an object, wherein the depth camera includes a depth camera body and a third configuration file. The depth camera body at least includes a set of lenses, a computation unit, and a storage unit. The third configuration file includes a first configuration file and a second configuration file. The first configuration file is stored in the storage unit and records a reference pixel number in the horizontal direction, an image sensor length (which is the length of the image sensor corresponding to one of the lenses), and a lens focal length (which is the fixed focal length of the one of the lenses). The second configuration file is stored in the storage unit and records a reference pixel number in the vertical direction, the distance of a longitudinal movement of a second object, and the lens focal length. The computation unit reads or records the third configuration file and runs an oblique velocity calculation system. The oblique velocity calculation system includes a lateral velocity calculation system for generating the lateral velocity of an object, a longitudinal velocity calculation system for generating the longitudinal velocity of the object, and oblique velocity calculation software for adding the square of the lateral velocity of the object and the square of the longitudinal velocity of the object and taking the square root of the sum so as to obtain the oblique velocity of the object, wherein the lateral velocity and/or the longitudinal velocity of the object is greater than or equal to zero.

Implementation of the present invention can produce at least the following advantageous effect: The oblique velocity of an object can be calculated in real time by way of an image-taking technique.

BRIEF DESCRIPTION OF THE DRAWINGS

The structure and the technical means adopted by the present invention to achieve the above and other objectives can be best understood by referring to the following detailed description of some preferred embodiments and the accompanying drawings, wherein.

DETAILED DESCRIPTION OF THE INVENTION

Figure 1:
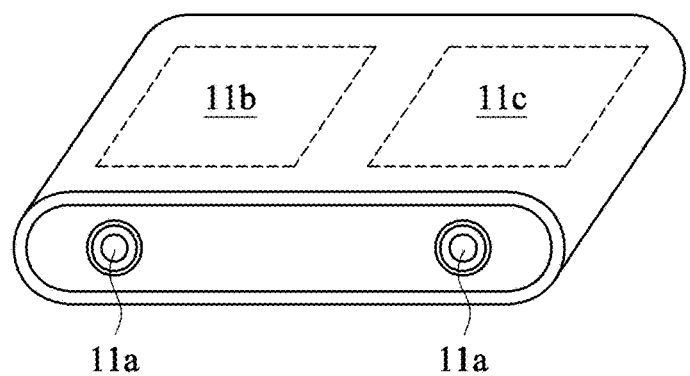
FIG. 1 schematically shows the structure of a conventional depth camera.

The depth cameras 100, 200, and 300 in the following embodiments of the present invention use the basic hardware architecture of the conventional depth camera 11 (e.g., the Intel RealSense D455 depth camera) shown in FIG. 1. The conventional depth camera 11 at least includes a set of lenses 11a, a storage unit 11b, and a computation unit 11c. The configuration file of the conventional depth camera 11 and the software executed by the conventional depth camera 11 have been substantially innovated in order to achieve the intended effect of each of the embodiments detailed below.

[Embodiment of a Depth Camera Capable of Measuring the Lateral Velocity of an Object]

Figure 2A:
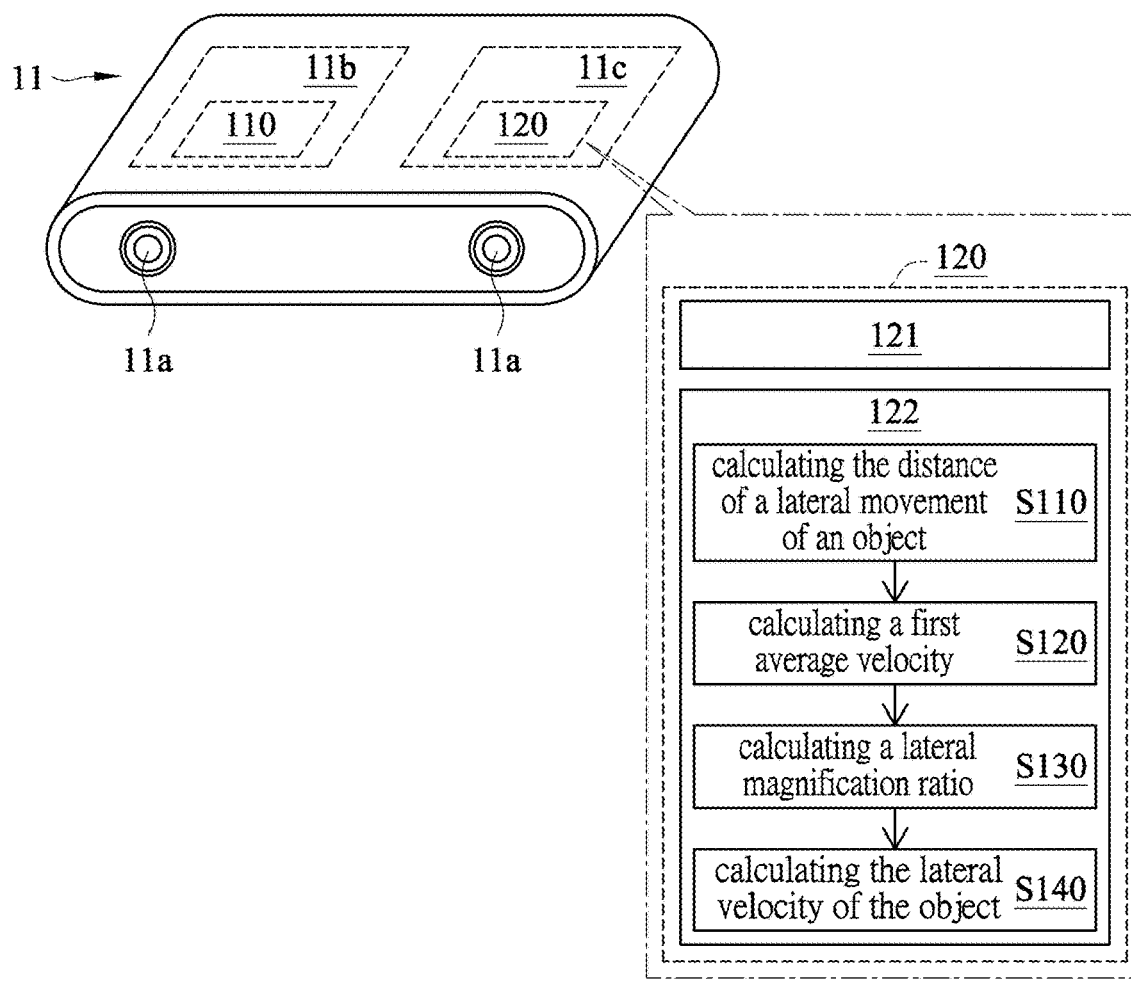
FIG. 2A shows the system structure of an embodiment of a depth camera capable of measuring the lateral velocity of an object.

Referring to FIG. 2A, the present invention provides an embodiment of a depth camera 100 capable of measuring the lateral velocity of an object. The depth camera 100 includes a depth camera body 11, a first configuration file 110, and a lateral velocity calculation system 120. As used herein in connection with this embodiment, the terms "lateral" and "lateral movement" refer to the moving direction or movement of an object that moves perpendicularly to the image-taking axis of the depth camera.

The first configuration file 110 is stored in a storage unit 11b of the depth camera body 11. The first configuration file 110 records a reference pixel number HPb in the horizontal direction, an image sensor length l, and a lens focal length f.

The reference pixel number HPb in the horizontal direction (e.g., 1920 pixels) can be viewed as a built-in scale that serves as a reference for distance measurement. The image sensor length l (e.g., 3.84 mm) is the length of the image sensor corresponding to one of the lenses 11a of the depth camera body 11. The lens focal length f (e.g., 1.88 mm) is the fixed focal length of the one of the lenses 11a.

To measure the lateral velocity of an object, a computation unit 11c of the depth camera body 11 reads or records the first configuration file 110 and runs the lateral velocity calculation system 120. The lateral velocity calculation system 120 includes first image-processing software 121 and lateral velocity calculation software 122.

Figure 2B:
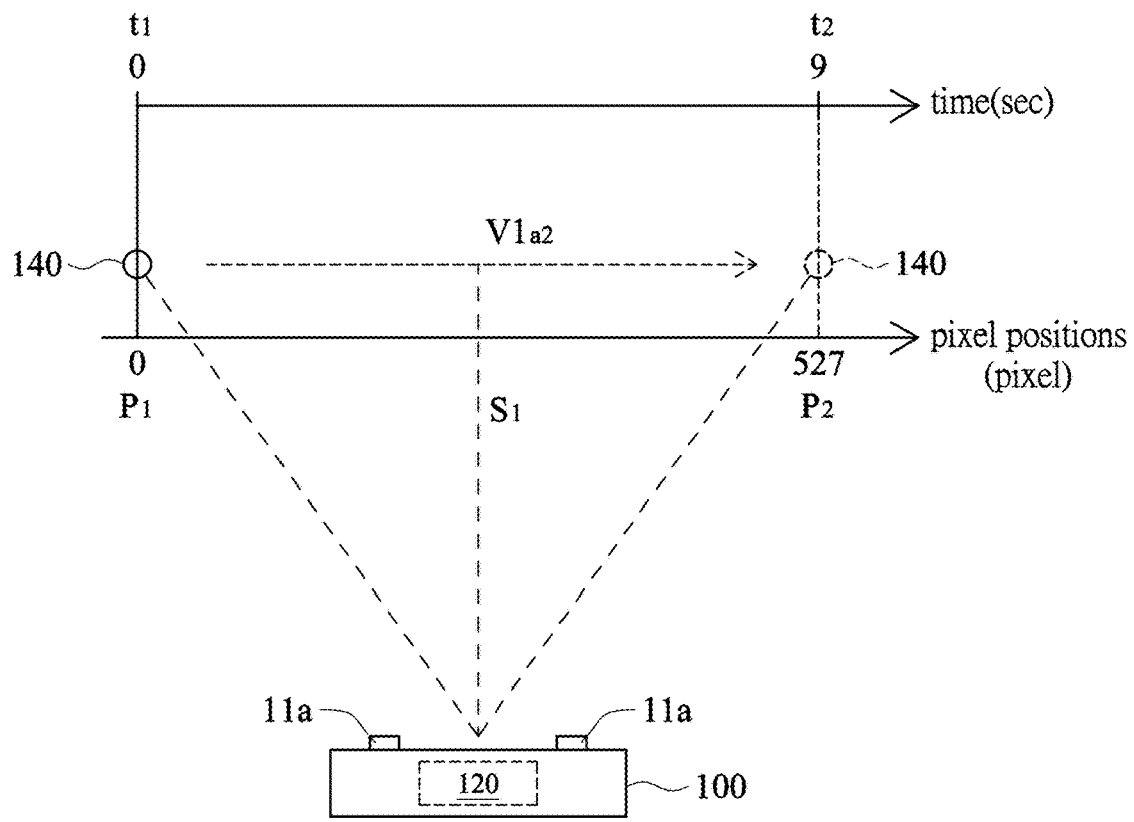
FIG. 2B shows the time points at which images are taken of a first object, the pixel positions of the first object at the time points at which the images are taken, and the depth distance at which the images are taken.

Referring to FIG. 2B, the first image-processing software 121 is configured to perform calculations for a first object 140 that is moving laterally. After an image is taken of the first object 140 at a first image-taking time point t1, and another image at a second image-taking time point t2 (the two images corresponding to the same time axis and the same horizontal axis that defines pixel positions), the first image-processing software 121 calculates the number of pixels $\Delta p$ corresponding to the lateral movement of the first object 140 between the first image-taking time point t1 and the second image-taking time point t2 and the duration $\Delta t1$ of the lateral movement of the first object 140. The first depth distance s1 at which the images are taken at the first image-taking time point t1 and the second image-taking time point t2 is also recorded by the first image-processing software 121.

The number of pixels $\Delta p$ corresponding to the lateral movement of the first object 140 is calculated as follows. The first object 140 at the second image-taking time point t2, or the 9-sec time point, is at the second position $P_2$, or the 527$^{th}$ pixel, and the first object 140 at the first image-taking time point t1, or the 0-sec time point, is at the first position P1, or the 0$^{th}$ pixel. Therefore, the number of pixels $\Delta p$ corresponding to the lateral movement of the first object 140 is 527 pixels, and the duration $\Delta t1$ of the lateral movement of the first object 140 is the time difference of 9 sec. The first depth distance s1, which is the distance from the one of the lenses 11a to the first object 140 when the images are taken, is 633 mm.

Figure 2C:
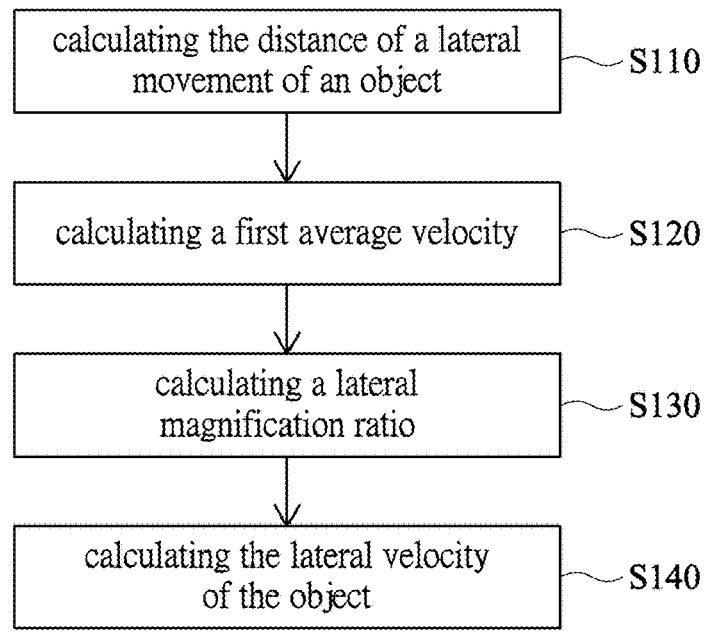
FIG. 2C shows a flowchart of the computation process of an embodiment of lateral velocity calculation software.

Referring to FIG. 2C, the lateral velocity calculation software 122 performs the steps of: calculating the distance of a lateral movement of an object (step S110); calculating a first average velocity (step S120); calculating a lateral magnification ratio (step S130); and calculating the lateral velocity of the object (step S140).

The step S110 of calculating the distance of a lateral movement of an object is carried out as follows. The distance $\Delta s'$ of the lateral movement of the object is calculated by dividing the number of pixels $\Delta p$ corresponding to the lateral movement of the first object by the reference pixel number HPb in the horizontal direction and then multiplying the quotient by the image sensor length l. The calculation can be expressed mathematically as:

Distance $\Delta s'$ of lateral movement of object =

$$\frac{\text{Number of pixels } \Delta p \text{ corresponding to lateral movement of first object}}{\text{Referene pixel number } HPb \text{ in horizontal direction}} \times \text{Image sensor length } l$$

By substituting actual values into the above equation, we obtain:

$$\text{Distance } \Delta s' \text{ of lateral movement of object} = \frac{527}{1920} \times 3.84 = 1.054 \,(\text{mm})$$

The step S120 of calculating a first average velocity is carried out as follows. The first average velocity v1' is calculated by dividing the distance $\Delta s'$ of the lateral movement of the object by the duration $\Delta t1$ of the lateral movement of the first object. The calculation can be expressed mathematically as:

First average velocity v1' =

$$\frac{\text{Distance } \Delta s' \text{ of lateral movement of object}}{\text{Duration } \Delta t1 \text{ of lateral movement of first object}}$$

By substituting actual values into the above equation, we obtain:

$$\text{First average velocity } v1' = \frac{1.054}{9} = 0.117 \,\text{cm/sec}$$

The step S130 of calculating a lateral magnification ratio is carried out as follows. The lateral magnification ratio MT is calculated by dividing the lens focal length f by the sum of the first depth distance s1 at which the images are taken and the lens focal length f. The calculation can be expressed mathematically as:

Lateral magnification ratio $M_T =$ $$\frac{\text{Lens focal length } f}{\text{First depth distance } s1 + \text{Lens focal length } f}$$

By substituting actual values into the above equation, we obtain:

$$\text{Lateral magnification ratio } M_T = \frac{1.88 \,\text{mm}}{-633 \,\text{mm} + 1.88 \,\text{mm}} = -2.98 \times 10^{-3}$$

The step S140 of calculating the lateral velocity of the object is carried out as follows. The lateral velocity vla2 of the object is calculated by dividing the first average velocity v1' by the absolute value of the lateral magnification ratio MT. The calculation can be expressed mathematically as:

$$\text{Lateral velocity } vla2 \text{ of object} = \frac{\text{First average velocity } v1'}{|\text{Lateral magnification ratio } M_T|}$$

By substituting actual values into the above equation, we obtain:

$$\text{Lateral velocity } v\text{la2 of object} = \frac{0.117 \text{ mm/sec}}{\left|-2.98 \times 10^{-3}\right|} = 39.2 \text{ mm/sec}$$

[Embodiment of a Depth Camera Capable of Measuring the Longitudinal Velocity of an Object]

Figure 3A:
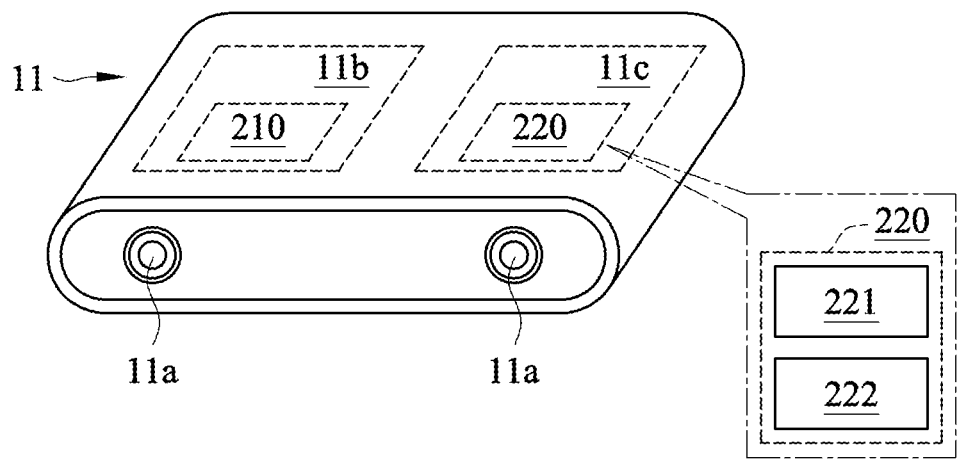
FIG. 3A shows the system structure of an embodiment of a depth camera capable of measuring the longitudinal velocity of an object.

Referring to FIG. 3A, the present invention further provides an embodiment of a depth camera 200 capable of measuring the longitudinal velocity of an object. The depth camera 200 includes a depth camera body 11, a second configuration file 210, and a longitudinal velocity calculation system 220. As used herein in connection with this embodiment, the terms "longitudinal" and "longitudinal movement" refer to the moving direction or movement of an object that moves parallel to the image-taking axis of the depth camera.

The second configuration file 210 is stored in a storage unit 11b of the depth camera body 11. The second configuration file 210 records a reference pixel number VPb in the vertical direction and a lens focal length f.

The reference pixel number VPb in the vertical direction (e.g., 1080 pixels) is also a built-in scale that serves as a reference for distance measurement. The lens focal length f is the same as that of the depth camera 100 capable of measuring the lateral velocity of an object, i.e., 1.88 mm.

To measure the longitudinal velocity of an object, a computation unit 11c of the depth camera body 11 reads or records the second configuration file 210 and runs the longitudinal velocity calculation system 220. The longitudinal velocity calculation system 220 includes second image-processing software 221 and longitudinal velocity calculation software 222.

Figure 3B:
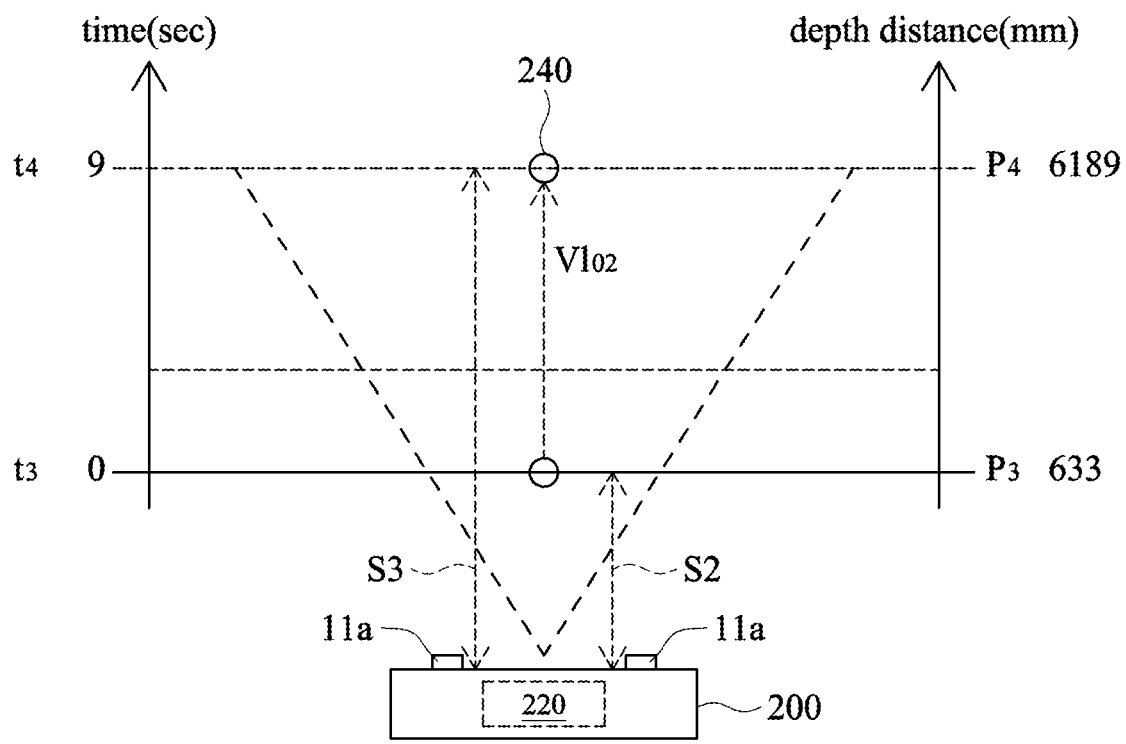
FIG. 3B shows the time points at which images are taken of a second object, the pixel positions of the second object at the time points at which the images are taken, and the depth distances at which the images are taken.

Referring to FIG. 3B, the second image-processing software 221 is configured to perform calculations and recording for a second object 240 that is moving longitudinally. After an image is taken of the second object 240 at a third image-taking time point t3, and another image at a fourth image-taking time point t4 (the two images corresponding to the same time axis and the same longitudinal axis that defines pixel positions), the second image-processing software 221 calculates the distance Δz2 of the longitudinal movement of the second object 240 and the duration Δt2 of the longitudinal movement of the second object 240. The second depth distance s2 at which the image corresponding to the third image-taking time point t3 is taken is recorded (e.g., 633 mm), and the second depth distance s2 corresponds to a third position P3 of the second object 240. The third depth distance s3 at which the image corresponding to the fourth image-taking time point t4 is taken is also recorded (e.g., 6189 mm), and the third depth distance s3 corresponds to a fourth position P4 of the second object 240.

The distance Δz2 of the longitudinal movement of the second object 240 is calculated as follows. The second object 240 at the fourth image-taking time point t4, or the 9-sec time point, is at the third depth distance s3, and the second object 240 at the third image-taking time point t3, or the 0-sec time point, is at the second depth distance s2. Therefore, the distance Δz2 of the longitudinal movement of the second object 240 is 5556 mm, and the duration Δt2 of the longitudinal movement of the second object is the time difference of 9 sec.

Figure 3C:
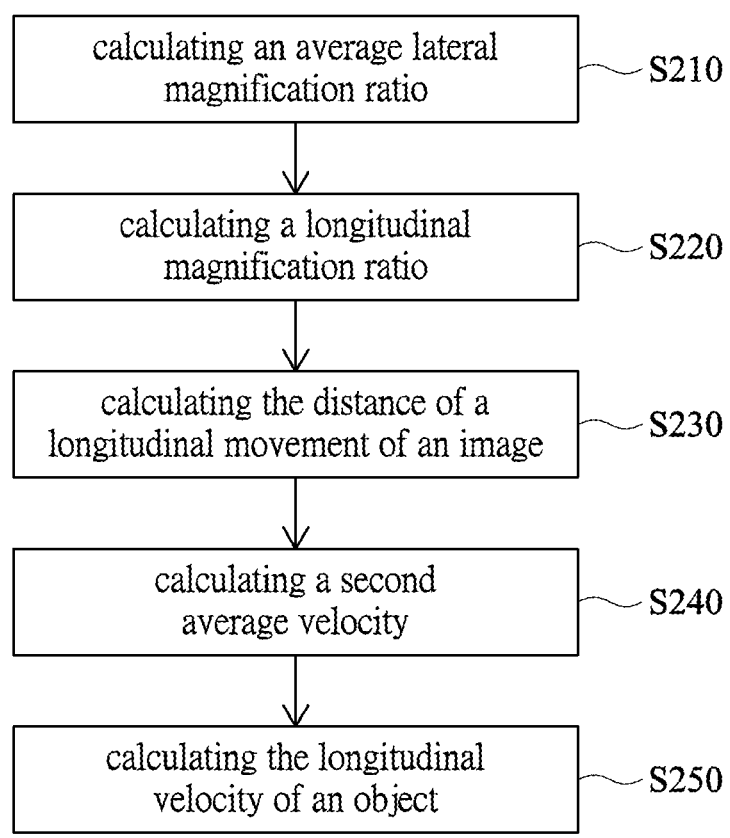
FIG. 3C shows a flowchart of the computation process of an embodiment of longitudinal velocity calculation software.

Referring to FIG. 3C, the longitudinal velocity calculation software 222 performs the steps of: calculating an average lateral magnification ratio (step S210); calculating a longitudinal magnification ratio (step S220); calculating the distance of a longitudinal movement of an image (step S230); calculating a second average velocity (step S240); and calculating the longitudinal velocity of an object (step S250).

The step S210 of calculating an average lateral magnification ratio is carried out as follows. The average lateral magnification ratio $M_{T1}$ is calculated by dividing the sum of the lateral magnification ratio $M_{TN}$ of the second object 240 at the nearest position (which corresponds to the shortest distance from the depth camera) and the lateral magnification ratio $M_{TF}$ of the second object 240 at the farthest position (which corresponds to the greatest distance from the depth camera) by 2. The calculation can be expressed mathematically as:

$$\text{Average lateral magnification ratio } M_{T_1} = \frac{\text{Lateral magnification ratio } M_{TN} \text{ at nearest position} + \text{Lateral magnification ratio } M_{TF} \text{ at farthest position } M_{TF}}{2}$$

Each of the lateral magnification ratio $M_{TN}$ at the nearest position and the lateral magnification ratio $M_{TF}$ at the farthest position is calculated by dividing the lens focal length f by the sum of the lens focal length f and the corresponding second or third depth distance s2 or s3. The calculation can be expressed mathematically as:

Lateral magnification ratio $M_{TN}$ at nearest position =

$$\frac{\text{Lens focal length } f}{\text{Second depth distance } s2 + \text{Lens focal length } f}$$

or as:

Lateral magnification ratio $M_{TF}$ at farthest position =

$$\frac{\text{Lens focal length } f}{\text{Third depth distance } s3 + \text{Lens focal length } f}$$

By substituting actual values into the above equations, we obtain:

Lateral magnification ratio $M_{TN}$ at nearest position =

$$\frac{1.88 \text{ mm}}{-633 \text{ mm} + 1.88 \text{ mm}} = -2.98 \times 10^{-3}$$

and

Lateral magnification ratio $M_{TF}$ at farthest position =

$$\frac{1.88 \text{ mm}}{-6189 \text{ mm} + 1.88 \text{ mm}} = -3.04 \times 10^{-4}$$

Therefore, by substituting actual values into the equation for the average lateral magnification ratio $M_{T1}$, we obtain:

$$\text{Average lateral magnification ratio } M_{T_1} = \frac{-2.98 \times 10^{-3} + -3.04 \times 10^{-4}}{2}$$

$$= -1.642 \times 10^{-3}$$

The step S220 of calculating a longitudinal magnification ratio is carried out as follows. The longitudinal magnification ratio $M_L$ is calculated as the square of the average lateral magnification ratio $M_{T_1}$. The calculation can be expressed mathematically as:

Longitudinal magnification ratio $M_L =$ $$(\text{Average lateral magnification ratio } M_{T_1})^2$$

By substituting actual values into the above equation, we obtain:

$$\text{Longitudinal magnification ratio } M_L = (-1.642 \times 10^{-3})^2$$
$$= 2.696 \times 10^{-6}$$

The step S230 of calculating the distance of a longitudinal movement of an image is carried out as follows. The distance $\Delta z'$ of the longitudinal movement of the image is calculated by multiplying the distance $\Delta z2$ of the longitudinal movement of the second object by the longitudinal magnification ratio $M_L$. The calculation can be expressed mathematically as:

Distance $\Delta z'$ of longitudinal movement of image =

Distance $\Delta z2$ of longitudinal movement of second object $\times$

Longitudinal magnification ratio $M_L$

By substituting actual values into the above equation, we obtain:

Distance $\Delta z'$ of longitudinal movement of image =

$$5556 \text{ mm} \times 2.696 \times 10^{-6} = 1.498 \times 10^{-2} \text{ mm}$$

The step S240 of calculating a second average velocity is carried out as follows. The second average velocity v2' is calculated by dividing the distance $\Delta z'$ of the longitudinal movement of the image by the duration $\Delta t2$ of the longitudinal movement of the second object. The calculation can be expressed mathematically as:

Second average velocity $v2' =$ $$\frac{\text{Distance } \Delta z' \text{ of longitudinal movement of image}}{\text{Duration } \Delta t2 \text{ of longitudinal movement of second object}}$$

By substituting actual values into the above equation, we obtain:

$$\text{Second average velocity } v2' = \frac{1.498 \times 10^{-2} \text{ mm}}{9 \text{ s}} = 1.664 \times 10^{-3} \text{ mm/s}$$

The step S250 of calculating the longitudinal velocity of an object is carried out as follows. The longitudinal velocity vlo2 of the object is calculated by dividing the second average velocity v2' by the longitudinal magnification ratio $M_L$. The calculation can be expressed mathematically as:

Longitudinal velocity vlo2 of object =

$$\frac{\text{Second average velocity } v2'}{\text{Longitudinal magnification ratio } M_L}$$

By substituting actual values into the above equation, we obtain:

$$\text{Longitudinal velocity } vlo2 \text{ of object} = \frac{1.664 \times 10^{-3} \text{ mm/s}}{2.696 \times 10^{-6}} = 617.2 \text{ mm/s}$$

[Embodiment of a Depth Camera Capable of Measuring the Oblique Velocity of an Object]

Figure 4A:
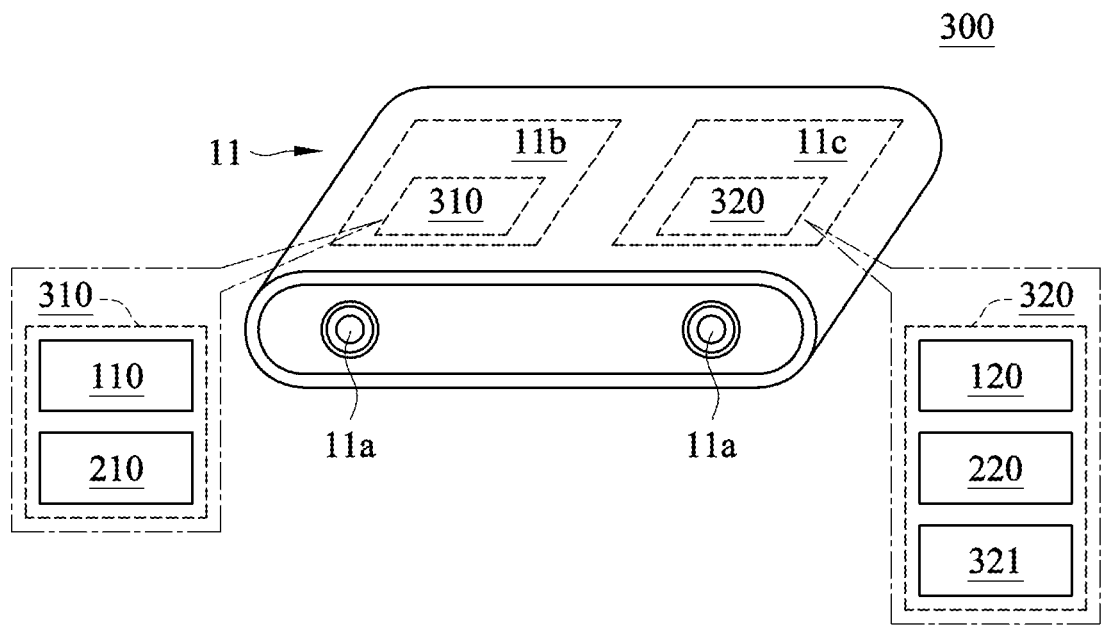
FIG. 4A shows the system structure of an embodiment of a depth camera capable of measuring the oblique velocity of an object.

Referring to FIG. 4A, the present invention further provides an embodiment of a depth camera 300 capable of measuring the oblique velocity of an object, e.g., measuring the oblique velocity of a third object 310 that is moving obliquely. The depth camera 300 capable of measuring the oblique velocity of an object includes a depth camera body 11, a third configuration file 310, and an oblique velocity calculation system 320.

The third configuration file 310 is stored in a storage unit 11b of the depth camera body 11. The third configuration file 310 records and includes the first configuration file 110 and the second configuration file 210.

To measure the oblique velocity of an object, a computation unit 11c of the depth camera body 11 reads or records the third configuration file 310 and runs the oblique velocity calculation system 320. The oblique velocity calculation system 320 includes the lateral velocity calculation system 120, the longitudinal velocity calculation system 220, and oblique velocity calculation software 321.

The depth camera 300 capable of measuring the oblique velocity of an object is used to measure the oblique velocity of the oblique movement of the third object 310 between a fifth image-taking time point t5 and a sixth image-taking time point t6. Therefore, the lateral velocity calculation system 120 and the longitudinal velocity calculation system 220 will use data corresponding to the fifth image-taking time point t5 and to the sixth image-taking time point t6 and data in the first configuration file 110 and in the second configuration file 210.

For example, the third object 310 at the fifth image-taking time point t5 (e.g., the 0-sec time point) is at a fifth position P5, whose pixel position along the horizontal axis of the pixel coordinate system is the 0th pixel and which corresponds to a fourth depth distance s4 (e.g., 633 mm), and the third object 310 at the sixth image-taking time point t6 (e.g., the 9-sec time point) is at a sixth position P6, whose pixel position along the horizontal axis of the pixel coordinate system is the 527th pixel and which corresponds to a fifth depth distance s5 (e.g., 6189 mm).

The lateral velocity calculation system 120 and the longitudinal velocity calculation system 220 perform calculations by substituting the duration of the lateral movement of the third object, i.e., 9 sec, for the duration $\Delta t1$ of the lateral movement of the first object and for the duration $\Delta t2$ of the longitudinal movement of the second object; by substituting the number of pixels corresponding to the lateral movement of the third object, i.e., 527 pixels, for the number of pixels $\Delta p$ corresponding to the lateral movement of the first object;

and by substituting the distance of the longitudinal movement of the third object, i.e., 5556 mm, for the distance Δz2 of the longitudinal movement of the second object.

The foregoing calculations also incorporate the data in the first configuration file 110, namely the reference pixel number HPb in the horizontal direction (e.g., 1920 pixels), the image sensor length l (e.g., 3.84 mm), and the lens focal length f (e.g., 1.88 mm); and the data in the second configuration file 210, namely the reference pixel number VPb in the vertical direction (e.g., 1080 pixels) and the lens focal length f (e.g., 1.88 mm).

After calculation, the lateral velocity vla2 of the object (e.g., 39.2 mm/s) is produced by the lateral velocity calculation system 120 for the third object 310

After calculation, the longitudinal velocity vlo2 of the object (e.g., 617.2 mm/s) is also produced by the longitudinal velocity calculation system 220 for the third object 310.

Figure 4B:
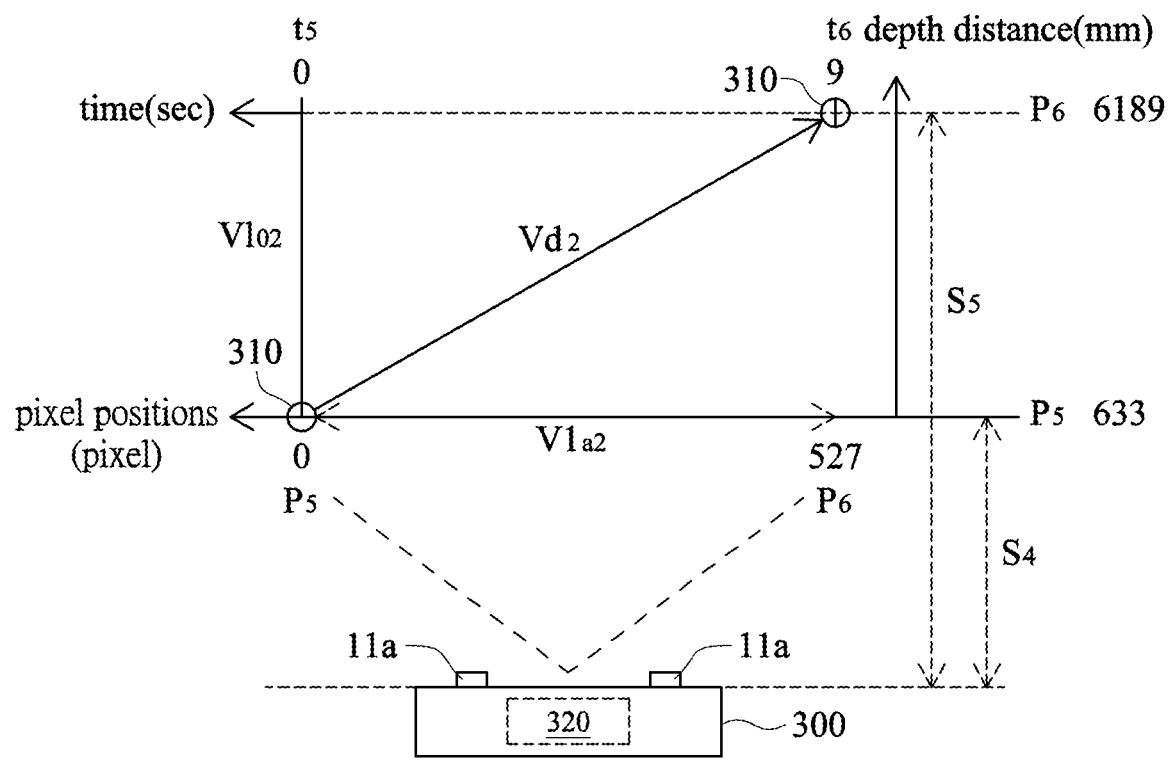
FIG. 4B shows the time points at which images are taken of a third object, the pixel positions of the third object at the time points at which the images are taken, and the depth distances at which the images are taken.

Referring to FIG. 4B, the oblique velocity calculation software 321 calculates the oblique velocity $v_{d2}$ of the object by taking the square root of the sum of the square of the lateral velocity vla2 of the object and the square of the longitudinal velocity vlo2 of the object. The lateral velocity vla2 of the object and/or the longitudinal velocity vlo2 of the object is greater than or equal to zero. If the lateral velocity vla2 of the object is zero, only a longitudinal movement of the object has taken place. If the longitudinal velocity vlo2 of the object is zero, only a lateral movement of the object has taken place. If the lateral velocity vla2 of the object and the longitudinal velocity vlo2 of the object are both zero, the object has not moved.

The calculation by the oblique velocity calculation software 321 can be expressed mathematically as:

$$\text{Oblique velocity } v_{d2} \text{ of object} = \sqrt{\begin{array}{l}(\text{Lateral velocity } vla2 \text{ of object})^2 + \\ (\text{Longitudinal velocity } vlo2 \text{ of object})^2\end{array}}$$

By substituting actual values into the above equation, we obtain:

$$\text{Oblique velocity } v_{d2} \text{ of object} = \sqrt{(39.2 \text{ mm/s})^2 + (617.2 \text{ mm/s})^2}$$
$$= 618 \text{ mm/s}$$

Figure 5:
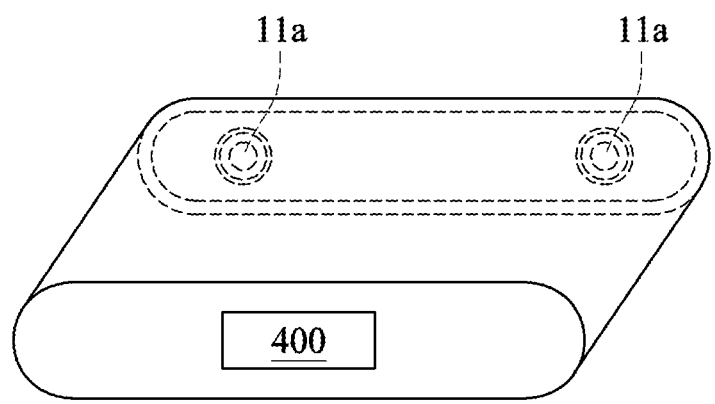
FIG. 5 shows an embodiment that demonstrates each of the foregoing embodiments further having a display module.

Referring to FIG. 5, each of the foregoing embodiments of the depth cameras 100, 200, and 300 may further have a display module 400 for displaying the lateral velocity vla2 of the object, the longitudinal velocity vlo2 of the object, and/or the oblique velocity $v_{d2}$ of the object.

The above description is based on only some preferred embodiments of the present invention and is not intended to limit the invention in any way. Although the invention has been disclosed above by way of the preferred embodiments, the embodiments are not intended to limit the invention. A person skilled in the relevant art will recognize that equivalent embodiments can be achieved by modifying, varying, or making equivalent changes to the disclosed embodiments without departing from the scope of the technical solution of the invention. Any simple modification or equivalent change that is made to the above embodiments according to the material contents of the invention shall be regarded as falling within the scope of the technical solution of the invention.

What is claimed is:

1. A depth camera capable of measuring an oblique velocity of an object, comprising:
    a depth camera body comprising a set of lenses, a computation unit, and a storage unit; and
    a third configuration file comprising:
        a first configuration file stored in the storage unit and recording a reference pixel number in a horizontal direction, an image sensor length, and a lens focal length, wherein the image sensor length is a length of an image sensor corresponding to one of the lenses, and the lens focal length is a fixed focal length of the one of the lenses; and
        a second configuration file stored in the storage unit and recording a reference pixel number in a vertical direction, a distance of a longitudinal movement of a second object, and the lens focal length;
    wherein the computation unit reads or records the third configuration file and runs an oblique velocity calculation system, the oblique velocity calculation system comprising:
        a lateral velocity calculation system for generating a lateral velocity of an object;
        a longitudinal velocity calculation system for generating a longitudinal velocity of the object, and
        oblique velocity calculation software for generating an oblique velocity of the object by taking a square root of a sum of a square of the lateral velocity of the object and a square of the longitudinal velocity of the object;
    wherein the lateral velocity of the object and/or the longitudinal velocity of the object is greater than or equal to zero.

2. The depth camera of claim 1, further comprising a display module for displaying the oblique velocity of the object.

3. The depth camera of claim 1, wherein the computation unit reads or records the first configuration file and runs the lateral velocity calculation system, the lateral velocity calculation system comprising:
    first image-processing software for recording a first depth distance at which images are taken of a first object at a first image-taking time point and a second image-taking time point, and for calculating the number of pixels corresponding to a lateral movement of the first object between the first image-taking time point and the second image-taking time point and a duration of the lateral movement of the first object; and
    lateral velocity calculation software for performing the steps of:
        calculating a distance of a lateral movement of the object by dividing the number of pixels corresponding to the lateral movement of the first object by the reference pixel number in the horizontal direction to produce a quotient and then multiplying the quotient by the image sensor length;
        calculating a first average velocity by dividing the distance of the lateral movement of the object by the duration of the lateral movement of the first object;
        calculating a lateral magnification ratio by dividing the lens focal length by a sum of the first depth distance and the lens focal length; and calculating the lateral velocity of the object by dividing the first average velocity by an absolute value of the lateral magnification ratio.

4. The depth camera of claim 3, wherein the number of pixels corresponding to the lateral movement of the first object is a difference between a pixel position of the first object in the horizontal direction at the second image-taking time point and a pixel position of the first object in the horizontal direction at the first image-taking time point.

5. The depth camera of claim 3, wherein the duration of the lateral movement of the first object is a time difference between the second image-taking time point of the first object and the first image-taking time point of the first object.

6. The depth camera of claim 3, further comprising a display module for displaying the lateral velocity of the object.

7. The depth camera of claim 1, wherein the computation unit reads or records the second configuration file and runs the longitudinal velocity calculation system, the longitudinal velocity calculation system comprising:

second image-processing software for recording a second depth distance at which an image is taken of the second object at a third image-taking time point and a third depth distance at which an image is taken of the second object at a fourth image-taking time point, and for calculating the distance of the longitudinal movement of the second object between the third image-taking time point and the fourth image-taking time point and a duration of the longitudinal movement of the second object; and longitudinal velocity calculation software for performing the steps of:

calculating an average lateral magnification ratio by dividing a sum of a lateral magnification ratio of the second object at a nearest position and a lateral magnification ratio of the second object at a farthest position by 2, wherein:

the lateral magnification ratio of the second object at the nearest position is calculated by dividing the lens focal length by a sum of the second depth distance and the lens focal length; and the lateral magnification ratio of the second object at the farthest position is calculated by dividing the lens focal length by a sum of the third depth distance and the lens focal length;

calculating a longitudinal magnification ratio by calculating a square of the average lateral magnification ratio;

calculating a distance of a longitudinal movement of an image by multiplying the distance of the longitudinal movement of the second object by the longitudinal magnification ratio;

calculating a second average velocity by dividing the distance of the longitudinal movement of the image by the duration of the longitudinal movement of the second object; and calculating the longitudinal velocity of the object by dividing the second average velocity by the longitudinal magnification ratio.

8. The depth camera of claim 7, wherein the distance of the longitudinal movement of the second object is a difference between the third depth distance of the second object at the fourth image-taking time point and the second depth distance of the second object at the third image-taking time point.

9. The depth camera of claim 7, wherein the duration of the longitudinal movement of the second object is a time difference between the fourth image-taking time point of the second object and the third image-taking time point of the second object.

10. The depth camera of claim 7, further comprising a display module for displaying the longitudinal velocity of the object.

* * * * *